Patented July 16, 1935

2,008,131

UNITED STATES PATENT OFFICE 2,008,131

PROCESS FOR MANUFACTURING BACTERICIDAL PRODUCTS AND RESULTING PRODUCT

Wilhelm Dieck, Berlin, and Sally Schiff, Berlin-Charlottenburg, Germany

No Drawing. Application July 10, 1933, Serial No. 679,824. In Germany July 12, 1932

11 Claims. (Cl. 99—1)

Our invention relates to a process for the manufacture of articles which have the property of poisoning nutritive media suitable for bacteria and other low organisms or which make it impossible for such organisms to exist or to develop on such media.

It has been known that metallic silver is capable of killing organisms living in water or in natural or artificial aqueous media, or that it is capable of preventing the development of germs which are introduced into such nutritive media. According to the results and the experiences hitherto obtained by the research work done so far, it may be assumed that this effect is due to the quantities of silver which are introduced in the solutions concerned from the metal in the shape of silver ions since silver is capable of forming an oxide which is stable at ordinary temperature and sufficiently soluble in water.

The tendency of silver to oxidize voluntarily is, however, very small indeed. Silver remains blank under conditions which with most other metals give rise to the formation of oxide films which are more or less easily detectable. In consequence, the quantities of oxide which are produced by voluntary oxidation are only very small and, therefore, their efficacy as regards the killing of germs in praxi is not of absolute constancy and uniformity. For this reason an effort has been made to increase the toxic effect of the silver by favouring its superficial oxidation and treatment with hydrogen peroxide has already been suggested. In addition, numerous processes for the activation of silver are known which are based on the same principle.

The poisonous effect of the metal is, as is well known, destroyed by ions which are capable of forming with the silver ion compounds of so small a solubility that the concentration of the solution as regards these compounds, when the solution is saturated therewith, remains below the limit which is poisonous for the organisms to be controlled. This effect always occurs when such quantities of the ion concerned are present that all the silver ions formed by the silver oxide are saturated. The ion which is most important in this respect is the sulphur ion. This forms nearly absolutely insoluble silver sulphide which coats the metal in the form of a film. This latter is of such density that the formation of new oxide and thereby a supply of fresh silver ions is prevented. This is especially the case when the original oxide layer has only been very thin and the quantity of sulphur ions relatively great. Thus, silver which has not been treated or which has been activated, for instance, with hydrogen peroxide becomes inefficient in all those places where hydrogen sulphide is formed from such albumen as is decomposed by bacteria.

This development of hydrogen sulphide takes place, for instance, in putrid pus and also, for example, where tissues or the remains of food are subjected to decomposition by the aid of bacteria. This occurs, for instance, in pulpa cavities opened up by caries or in the root channels of diseased teeth. Under these circumstances a silver even if activated with hydrogen peroxide can not exert a considerable or a lasting toxic effect. Wires or sheets of pure silver even when activated with hydrogen peroxide are soon overgrown by bacteria when introduced in cultures of such and the sterile ring noticeable round the metal which is characteristic for the toxic action does not occur.

We have found that we have been able not only to preserve the action of silver as regards the destruction of germs or bacteria under the conditions mentioned but also to obtain an extremely strong and lasting action which is not interfered with, for instance, by bacteria forming hydrogen sulphide when we provide for the simultaneous presence of manganese oxide compounds. According to our invention we were able to obtain this aim by allowing a solution of potassium permanganate to act upon metallic silver. According to C. Lea silver oxide is formed while the permanganate is reduced and a compound which contains silver oxide and manganese oxide is generated. This compound may be a silver manganite having the composition $Ag_2O \cdot 2MnO_2$.

Our experiments have shown that articles such as, for instance, nets, wires or the like which have been coated with a black film consisting of the said oxides by allowing them to remain in a permanganate solution for a day, and which then have been well rinsed with water and subsequently smoked in the wet state with hydrogen sulphide, kept their full efficacy towards all bacteria tested. Other silver samples treated in an analogous manner proved to be completely inefficient even when previously treated with hydrogen peroxide. Wires which have been treated with permanganate solution according to our invention after they have been introduced ten subsequent times into fresh cultures where they remained for a whole day have shown no decrease of their increased efficacy and at the end showed the same perfect effect as in the first culture.

In order to produce articles containing silver in accordance with our invention we can start with products containing metallic silver and which per se are known. Such articles are, for instance, ceramic products which contain the silver in a finely distributed form such, for instance, as coatings, films or the like, or in which the silver is embedded throughout the mass. These articles are subjected according to our invention to the action of permanganate solution.

Another way of manufacturing articles according to our invention is to subject silver permanganate, for instance, in the form of finely divided and embedded products to the action of reducing agents.

As products in accordance with the application, we contemplate articles made of metallic silver, or silver alloys respectively, or articles which have been coated with metallic silver or silver alloys. For example, we have in mind such articles as wires, sheets, or the like, or finished articles such as, for instance, inlays or the like which have been supplied with coatings of the said kind of silver oxide and manganese oxide compounds, although we do not intend to be limited except in accordance with the appended claims.

Furthermore, masses which are obtained by the action of permanganate solution upon metallic silver or, for instance, by the reduction of silver permanganate may be employed, for instance, in the form of powders, fillings of porous containers, or may be embedded in a finely divided form in or upon porous substances such as filter candles, in or upon carriers such as, for instance, dressing, muslin, court-plaster, dental cements and the like.

These sterile filter materials for instance, can be produced, for example, by adding the efficient material to these substances in a pulverulent form, and then in forming the carriers, such as filter plates, containers and the like. Filling materials such as dental cements, guttapercha and the like can be made continuously antiseptic and nevertheless perfectly so as not to cause irritation, by allowing the reagents one after the other to act upon or in these carriers, in order to produce the efficient material. This procedure is especially suitable, for instance, for containers for water sterilization.

The products made according to our invention consisting of, or containing compounds of silver, silver oxide and manganese oxide compounds or masses containing these compounds, are distinguished by very high bactericidal power and stability against noxious influences as mentioned above. They are, therefore, especially suited for purposes for which all other compounds containing silver have proved unsuitable.

What we claim is:

1. The process of sterilizing liquids which consists in contacting the liquid with a compound containing silver oxide and manganese oxide.

2. The process of sterilizing liquids which consists in contacting the liquid with a carrier impregnated with a compound containing silver oxide and manganese oxide.

3. A bactericidal article comprising a carrier impregnated with a compound containing silver oxide and manganese oxide.

4. A bactericide comprising a composition containing silver oxide and manganese oxide.

5. A bactericidal article comprising a carrier and a composition containing silver oxide and manganese oxide carried thereby.

6. A bactericidal article comprising a wound dressing material impregnated with a composition containing silver oxide and manganese oxide.

7. Bactericidal textile-material impregnated with a composition containing silver oxide and manganese oxide.

8. A process of producing a bactericidal product which consists in treating a carrier having silver or a silver compound carried thereby so as to convert the silver or silver compound to a compound containing silver oxide and manganese oxide.

9. A process for preparing a bactericidal article which consists in converting silver on a carrier to a composition containing silver oxide and manganese oxide.

10. A process for preparing a bactericidal article which consists in treating a carrier impregnated with silver with an alkali metal permanganate.

11. A process for preparing a bactericidal article which consists in applying silver permanganate to a carrier and reducing the permanganate to form silver manganate.

WILHELM DIECK.
SALLY SCHIFF.